United States Patent
Hirayama

(10) Patent No.: US 9,336,472 B2
(45) Date of Patent: May 10, 2016

(54) IMAGE FORMING APPARATUS

(71) Applicant: KYOCERA Document Solutions Inc., Osaka-shi, Osaka (JP)

(72) Inventor: Hayato Hirayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/037,723

(22) Filed: Sep. 26, 2013

(65) Prior Publication Data

US 2014/0085673 A1 Mar. 27, 2014

(30) Foreign Application Priority Data

Sep. 27, 2012 (JP) .................................. 2012-213509

(51) Int. Cl.
*G06F 15/00* (2006.01)
*G06K 15/00* (2006.01)
*G03G 21/14* (2006.01)

(52) U.S. Cl.
CPC ............ *G06K 15/4025* (2013.01); *G03G 21/14* (2013.01)

(58) Field of Classification Search
CPC ....................... H04N 1/00649; H04N 1/00657
USPC ....................................................... 358/1.15
See application file for complete search history.

(56) References Cited

U.S. PATENT DOCUMENTS

| 5,917,777 | A | * | 6/1999 | Tanigawa ........................ 368/10 |
| 2011/0161717 | A1 | | 6/2011 | Nojiri |
| 2013/0034197 | A1 | * | 2/2013 | Aweya et al. ................. 375/362 |
| 2014/0056286 | A1 | * | 2/2014 | Nagata .......................... 370/336 |

FOREIGN PATENT DOCUMENTS

| JP | 2010-128207 | 6/2010 |
| JP | 2011-150310 | 8/2011 |

OTHER PUBLICATIONS

Machine translation of Japanese Patent Document No. 2010-128207, Fujii, Jun. 10, 2010.*

* cited by examiner

*Primary Examiner* — Tammy Pham
*Assistant Examiner* — Mark Milia
(74) *Attorney, Agent, or Firm* — Gerald E. Hespos; Michael J. Porco; Matthew T. Hespos

(57) ABSTRACT

An image forming apparatus includes a master control unit and a slave control unit. The master control unit operates in synchronization with a master clock signal. The slave control unit operates according to an operation instruction by the master control unit in synchronization with a slave clock signal. The slave control unit includes a slave clock generator for generating the slave clock signal, and a signal output unit for outputting the slave clock signal to the master control unit. The master control unit includes a master clock generator for generating the master clock signal with a higher time accuracy than the slave clock signal, and a clock error calculator for calculating an error of the slave clock signal based on obtained information representing a cycle of the slave clock signal using the master clock signal.

5 Claims, 8 Drawing Sheets

IMAGE FORMING APPARATUS

INCORPORATION BY REFERENCE

This application is based on Japanese Patent Application Serial No. 2012-213509 filed with the Japan Patent Office on Sep. 27, 2012, the contents of which are hereby incorporated by reference.

BACKGROUND

The present disclosure relates to an image forming apparatus including a plurality of control units which operate in synchronization with clock signals and configured to carry out a decentralized control and particularly to a technique for calculating an error of a clock signal.

Conventionally, there is known an image forming apparatus including a plurality of control units which operate in synchronization with clock signals and configured to carry out a decentralized control. To accurately synchronize the operation of each control unit, the time accuracy of the clock signal of each control unit needs to be high. However, an oscillator for generating a clock signal with a high time accuracy is expensive. Accordingly, in such an image forming apparatus, an error of a clock signal is calculated so as not to cause a large difference in the accuracy of an operation controlled by each control unit. Then, this image forming apparatus corrects a control parameter relating to the operation based on the calculated error of the clock signal.

For example, the following conventional technique is known. A master CPU transmits communication data to a slave CPU at a transmission interval which is a predetermined multiple of a cycle of a clock signal of the master CPU. The slave CPU counts a clock number of the clock signal during the period of the transmission interval of the communication data transmitted from the master CPU using a clock signal of the slave CPU. The slave CPU calculates a frequency (cycle) of the clock signal of the slave CPU using that count value and the above transmission interval. Then, the slave CPU sets a difference between the calculated frequency (or cycle) and a frequency (or cycle) of a predetermined clock signal of the slave CPU as an error of the clock signal of the slave CPU.

In this way, only a clock signal generation circuit of the master CPU can be configured by an expensive oscillator for generating a clock signal with a high time accuracy. On the other hand, a clock signal generation circuit of the slave CPU can be configured by an inexpensive oscillator for generating a clock signal with a low time accuracy.

In the above technique, the clock number of the clock signal of the slave CPU is counted during the period of the transmission interval of the communication data transmitted from the master CPU. Thus, the transmission interval of the communication data from the master CPU needs to be longer than the cycle of the clock signal of the slave CPU. Further, to accurately calculate the error of the frequency (or cycle) of the clock signal of the slave CPU, the transmission interval of the communication data needs to be precisely set to be the predetermined multiple of the cycle of the clock signal of the master CPU.

However, to conduct data communication at the transmission interval that is the predetermined multiple of the cycle of the clock signal of the master CPU, a conversion circuit is necessary which converts the clock signal of the master CPU into a clock signal which oscillates at the transmission interval that is the predetermined multiple of the cycle of the clock signal of the master CPU. In this conversion process of the clock signal, the transmission interval may not be precisely the predetermined multiple of the cycle of the clock signal of the master CPU due to the conversion accuracy of the conversion circuit. In this case, the slave CPU calculates an error of the clock signal of the slave CPU using the transmission interval that is not precisely the multiple of the cycle of the clock signal of the master CPU. This may lead to a possibility that the error of the clock signal of the slave CPU is not accurately calculated.

The present disclosure aims to accurately calculate an error of a clock signal in an image forming apparatus including a plurality of control units which operate in synchronization with clock signals and configured to carry out a decentralized control.

SUMMARY

An image forming apparatus according to the present disclosure includes a master control unit and a slave control unit. The master control unit operates in synchronization with a master clock signal which oscillates at a predetermined master frequency. The slave control unit operates according to an operation instruction by the master control unit in synchronization with a slave clock signal which oscillates at a slave frequency lower than the master frequency. The slave control unit includes a slave clock generator and a signal output unit. The slave clock generator generates the slave clock signal. The signal output unit outputs the slave clock signal to the master control unit. The master control unit includes a master clock generator and a clock error calculator. The master clock generator generates the master clock signal with a higher time accuracy than the slave clock signal. The clock error calculator obtains cycle information representing a cycle of the slave clock signal output from the signal output unit using the master clock signal and calculates an error of the slave clock signal based on the obtained cycle information.

These and other objects, features and advantages of the present disclosure will become more apparent upon reading the following detailed description along with the accompanying drawings.

DETAILED DESCRIPTION

Figure 1:
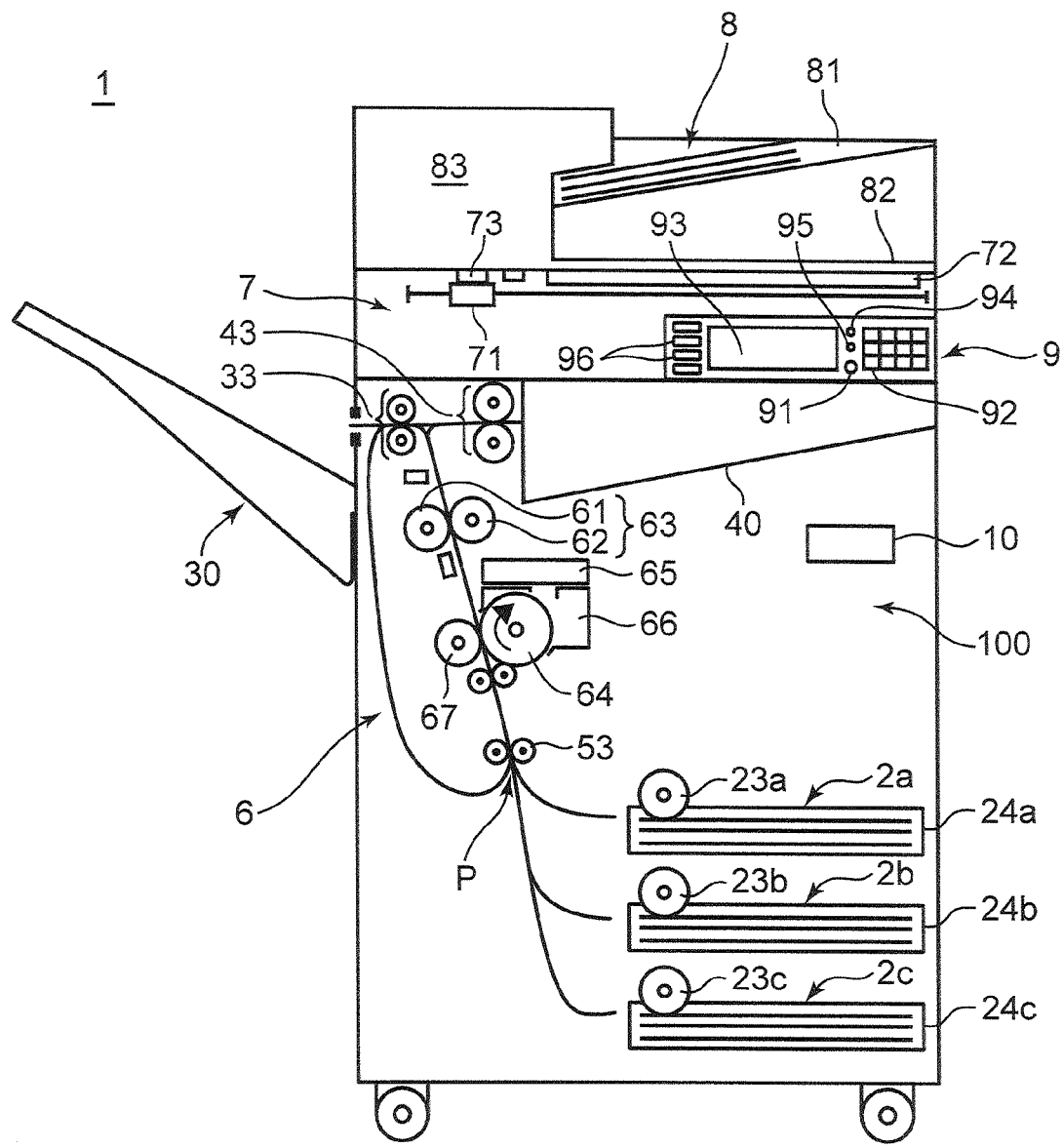
FIG. 1 is a schematic configuration diagram of a complex machine according to one embodiment of the present disclosure.

Hereinafter, embodiments of the present disclosure are described based on the drawings. FIG. 1 is a schematic configuration diagram of a complex machine 1 according to one embodiment of the present disclosure.

As shown in FIG. 1, the complex machine 1 includes an image reading unit 7, a document feeding unit 8, an operation unit 9 enabling a user to enter various operation commands and the like, and a main unit 100.

The image reading unit 7 includes a scanner unit 71, a document platen 72 and a document reading slit 73. The scanner unit 71 includes a CCD (Charge Coupled Device) sensor and a light source unit such as an exposure lamp. The document platen 72 is made of a transparent material such as glass.

The scanner unit 71 is configured to be movable by an unillustrated driving unit. In the case of reading a document placed on the document platen 72, the scanner unit 71 scans a document image and outputs obtained image data while moving along a document surface at a position facing the document platen 72. Further, in the case of reading a document fed by the document feeding unit 8, the scanner unit 71 moves to a position facing the document reading slit 73. Then, the scanner unit 71 obtains an image of the document in synchronization with a document conveying operation by the document feeding unit 8 via the document reading slit 73 and outputs obtained image data.

The document feeding unit 8 includes a document placing portion 81, a document discharging portion 82 and a document conveying mechanism 83. Documents are placed on the document placing portion 81. Documents having an image read are discharged to the document discharging portion 82. The document conveying mechanism 83 picks up the documents placed on the document placing portion 81 one by one and conveys them to a position facing the document reading slit 73, and then discharges them to the document discharging portion 82.

The document feeding unit 8 is provided rotatably relative to the image reading unit 7. This enables a front surface side of the document feeding unit 8 to move upward. An operator can place a document to be read such as a book in a spread state on the upper surface of the document platen 72 by moving the front surface side of the document feeding unit 8 upward and exposing the upper surface of the document platen 72.

The operation unit 9 includes a start key 91 for entering instructions to execute various functions provided in the complex machine 1, a numerical keypad 92 for entering the number of copies to be printed and the like, and a display unit 93 for displaying various pieces of information. The display unit 93 is, for example, a liquid crystal display with a touch panel function. The operation unit 9 further includes a reset key 94 for resetting set contents and the like, a stop key 95 for stopping a printing (image forming) operation being executed and function switch keys 96 for switching a copy function, a printer function, a scanner function and a facsimile function from one to another.

The main unit 100 includes a plurality of sheet feeding units 2a, 2b and 2c, an image forming unit 6 for forming an image on a recording sheet fed by the sheet feeding unit 2a, 2b, 2c, registration rollers 53, conveyor roller pairs 33, 43, and a master control unit 10 (overall control unit).

The sheet feeding unit 2a includes a sheet cassette 24a for storing recording sheets and a sheet feed roller 23a for picking up (feeding) sheets one by one from the sheet cassette 24a. The sheet feed roller 23a is driven by a motor 22a to be described later.

Similarly, the sheet feeding unit 2b includes a sheet cassette 24b for storing recording sheets and a sheet feed roller 23b for picking up sheets one by one from the sheet cassette 24b. The sheet feed roller 23b is driven by a motor 22b to be described later.

Further, the sheet feeding unit 2c includes a sheet cassette 24c for storing recording sheets and a sheet feed roller 23c for picking up sheets one by one from the sheet cassette 24c. The sheet feed roller 23c is driven by a motor 22c to be described later.

The image forming unit 6 includes an optical unit 65 and a developing unit 66. The optical unit 65 exposes a photoconductive drum 64 to light by outputting laser light or the like based on image data obtained by the image reading unit 7 to be described later. The developing unit 66 forms a toner image on the photoconductive drum 64.

The image forming unit 6 further includes a transfer unit 67 and a fixing unit 63. The transfer unit 67 transfers a toner image on the photoconductive drum 64 to a recording sheet. The fixing unit 63 includes a pair of rollers 61, 62. The pair of rollers 61, 62 fixes a toner image to a recording sheet by heating the recording sheet having the toner image transferred thereto.

The registration rollers 53 are arranged downstream of a joint point P of conveyance paths for recording sheets fed by the respective sheet feeding units 2a, 2b and 2c. The registration rollers 53 are roller members driven by a motor 52 to be described later. The registration rollers 53 adjust a timing at which a recording sheet fed by each sheet feeding unit 2a, 2b, 2c is conveyed to the image forming unit 6. Further, the registration rollers 53 adjust the posture of the recording sheet.

The conveyor roller pair 33 is a pair of roller members driven by a motor 32 to be described later. The conveyor roller pair 33 conveys a recording sheet having an image formed thereon by the image forming unit 6 to a stack tray 30 provided to the left of the main unit 100.

The conveyor roller pair 43 is a pair of roller members driven by a motor 42 to be described later. The conveyor roller pair 43 conveys a recording sheet having an image formed thereon by the image forming unit 6 to a discharge tray 40 provided in an upper part of the main unit 100.

The master control unit 10 controls the overall operation of the complex machine 1.

Figure 2:
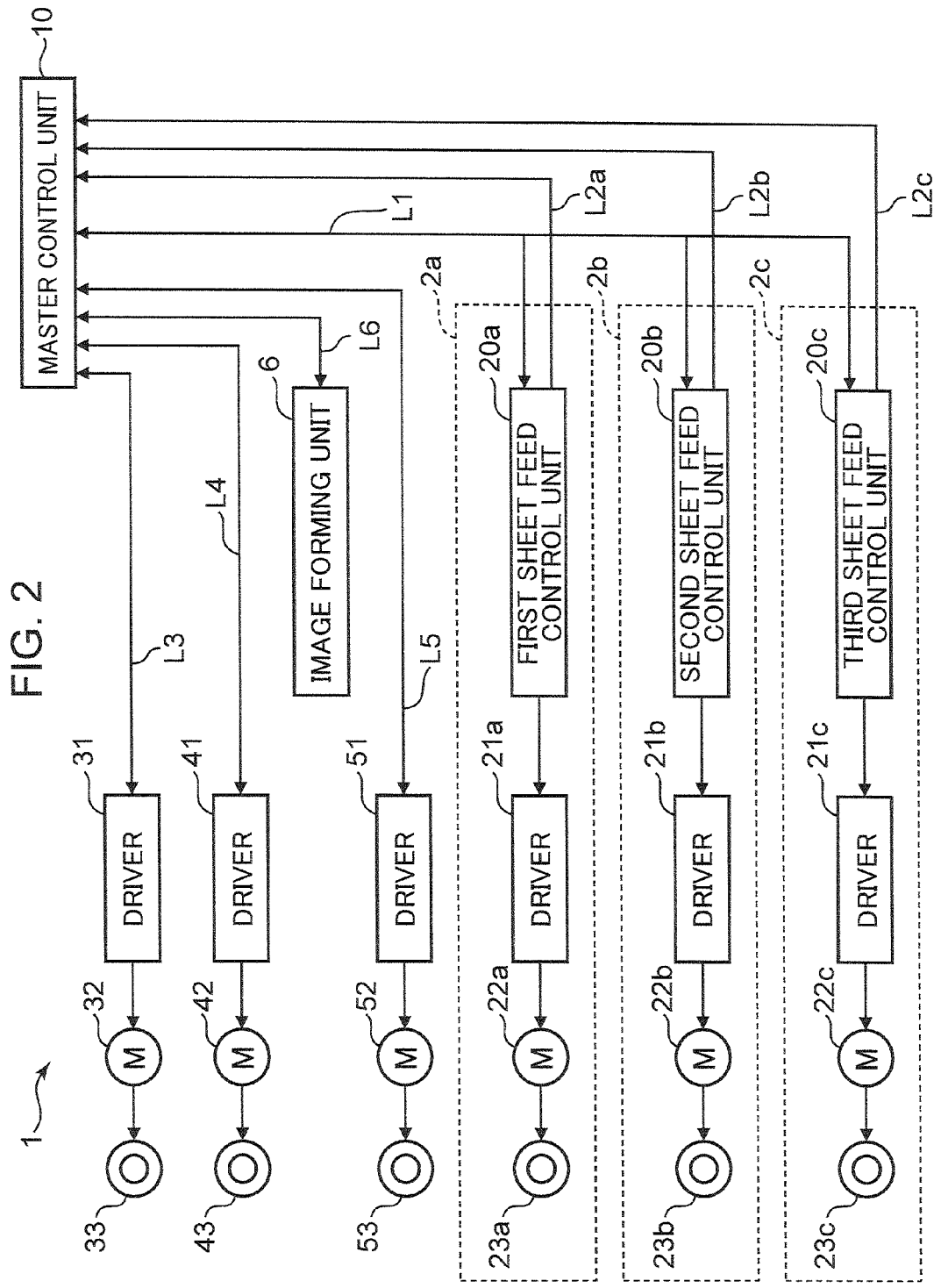
FIG. 2 is a block diagram showing the electrical configuration of the complex machine.

FIG. 2 is a block diagram showing the electrical configuration of the complex machine 1. Components denoted by the same reference signs as in FIG. 1 are not described unless otherwise particularly noted.

As shown in FIG. 2, the complex machine 1 includes the registration rollers 53, the motor 52 for driving the registration rollers 53, and a driver 51 for driving and rotating the motor 52. The complex machine 1 further includes the conveyor roller pair 43, the motor 42 for driving the conveyor roller pair 43, a driver 41 for driving and rotating the motor 42, the conveyor roller pair 33, the motor 32 for driving the conveyor roller pair 33, a driver 31 for driving and rotating the motor 32, the image forming unit 6, the sheet feeding units 2a to 2c and the master control unit 10.

The sheet feeding unit 2a includes the sheet feed roller 23a, the motor 22a for driving the sheet feed roller 23a, a driver 21a for driving and rotating the motor 22a, and a first sheet feed control unit (slave control unit) 20a. Similarly, the sheet feeding unit 2b includes the sheet feed roller 23b, the motor 22b for driving the sheet feed roller 23b, a driver 21b for driving and rotating the motor 22b, and a second sheet feed control unit (slave control unit) 20b. Further, the sheet feeding unit 2c includes the sheet feed roller 23c, the motor 22c for driving the sheet feed roller 23c, a driver 21c for driving and rotating the motor 22c, and a third sheet feed control unit (slave control unit) 20c.

The first sheet feed control unit 20a is connected to the master control unit 10 by a control line L1 such as a serial communication line and a signal line L2a. The first sheet feed control unit 20a controls a sheet feeding operation of the sheet feeding unit 2a according to an operation instruction by the master control unit 10. Specifically, the first sheet feed control unit 20a outputs a drive clock signal of a frequency corresponding to the rotation speed of the motor 22a to the driver 21a according to the operation instruction by the master control unit 10. That is, the first sheet feed control unit 20a drives and rotates the motor 22a at a rotation speed corresponding to the drive clock signal via the driver 21a. In this way, the first sheet feed control unit 20a controls a rotational movement of the sheet feed roller 23a.

Similarly, the second sheet feed control unit 20b is connected to the master control unit 10 by the control line L1 such as a serial communication line and a signal line L2b. The second sheet feed control unit 20b controls a sheet feeding operation of the sheet feeding unit 2b according to an operation instruction by the master control unit 10. Specifically, the second sheet feed control unit 20b outputs a drive clock signal of a frequency corresponding to the rotation speed of the motor 22b to the driver 21b according to the operation instruction by the master control unit 10. That is, the second sheet feed control unit 20b drives and rotates the motor 22b at a rotation speed corresponding to the drive clock signal via the driver 21b. In this way, the second sheet feed control unit 20b controls a rotational movement of the sheet feed roller 23b.

Further, the third sheet feed control unit 20c is connected to the master control unit 10 by the control line L1 such as a serial communication line and a signal line L2c. The third sheet feed control unit 20c controls a sheet feeding operation of the sheet feeding unit 2c according to an operation instruction by the master control unit 10. Specifically, the third sheet feed control unit 20c outputs a drive clock signal of a frequency corresponding to the rotation speed of the motor 22c to the driver 21c according to the operation instruction by the master control unit 10. That is, the third sheet feed control unit 20c drives and rotates the motor 22c at a rotation speed corresponding to the drive clock signal via the driver 21c. In this way, the third sheet feed control unit 20c controls a rotational movement of the sheet feed roller 23c.

In the following description, the sheet feeding units 2a, 2b and 2c are collectively referred to as sheet feeding units 2. The first, second and third sheet feed control units 20a, 20b and 20c are collectively referred to as sheet feed control units 20. The drivers 21a, 21b and 21c are collectively referred to as drivers 21. The motors 22a, 22b and 22c are collectively referred to as motors 22. The sheet feed rollers 23a, 23b and 23c are collectively referred to as sheet feed rollers 23. The signal lines L2a, L2b and L2c are collectively referred to as signal lines L2.

The master control unit 10 selects the sheet feeding unit 2 storing recording sheets corresponding to a condition of an image forming operation out of the sheet feeding units 2a, 2b and 2c. The condition of the image forming operation is entered using the operation unit 9. The master control unit 10 instructs to control the rotational movement of the sheet feed roller 23 to the sheet feed control unit 20 for controlling the operation of the selected sheet feeding unit 2.

Further, the master control unit 10 is connected to the image forming unit 6 by a control line L6 such as a serial communication line. The master control unit 10 controls developing, transferring and fixing operations in the image forming unit 6 so that an image is formed at a predetermined position of a recording sheet conveyed by the registration rollers 53 after being fed by the sheet feeding unit 2.

Further, the master control unit 10 is connected to the driver 31 by a signal line L3. The master control unit 10 outputs a drive clock signal of a frequency corresponding to the rotation speed of the motor 32 to the driver 31 via the signal line L3. The driver 31 drives and rotates the motor 32 at a rotation speed corresponding to the drive clock signal. In this way, the master control unit 10 controls rotational movements of the conveyor roller pair 33.

Further, the master control unit 10 is connected to the driver 41 by a signal line L4. The master control unit 10 outputs a drive clock signal of a frequency corresponding to the rotation speed of the motor 42 to the driver 41 via the signal line L4. The driver 41 drives and rotates the motor 42 at a rotation speed corresponding to the drive clock signal. In this way, the master control unit 10 controls rotational movements of the conveyor roller pair 43.

Further, the master control unit 10 is connected to the driver 51 by a signal line L5. The master control unit 10 outputs a drive clock signal of a frequency corresponding to the rotation speed of the motor 52 to the driver 51 via the signal line L5. The driver 51 drives and rotates the motor 52 at a rotation speed corresponding to the drive clock signal. In this way, the master control unit 10 controls rotational movements of the registration rollers 53.

That is, the master control unit 10 adjusts timings of the respective operations and movements of the first, second and third sheet feed controllers 20a, 20b and 20c, the registration rollers 53, the image forming unit 6 and the conveyor roller pairs 33 and 43 to convey a recording sheet to the stack tray 30 or the discharge tray 40 after an image is formed at a predetermined position of the recording sheet conveyed by the registration rollers 53 after being fed by the sheet feeding unit 2.

Figure 3:
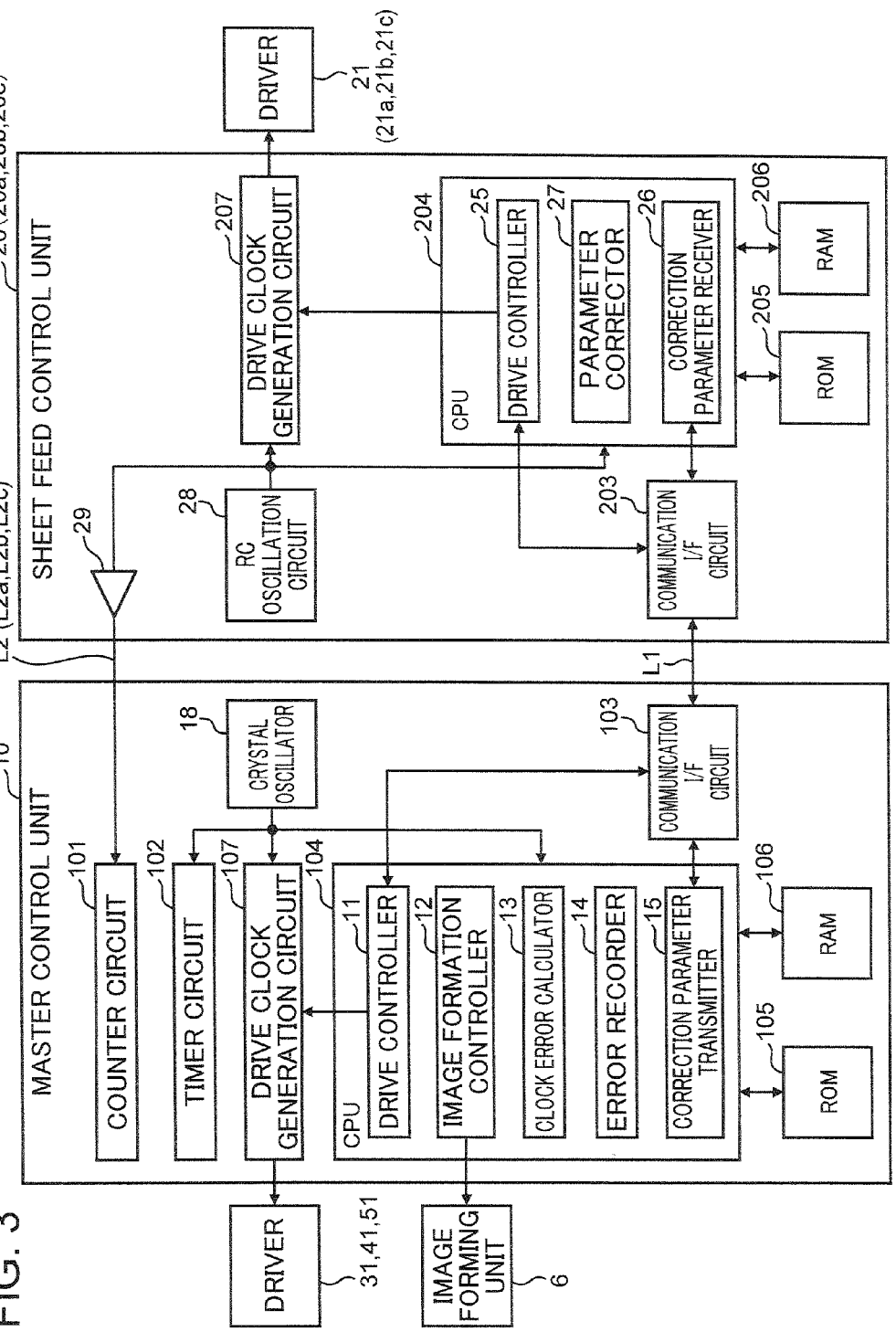
FIG. 3 is a block diagram showing the detailed configurations of a master control unit and a sheet feed control unit.

The master control unit 10 and the sheet feed control unit 20 are described in detail below. FIG. 3 is a block diagram showing the detail configurations of the master control unit 10 and the sheet feed control unit 20.

As shown in FIG. 3, the master control unit 10 includes a crystal oscillator (master clock generator) 18, a counter circuit 101, a timer circuit 102, a communication interface (I/F) circuit 103, a CPU (Central Processing Unit) 104 for preforming a predetermined arithmetic processing, a ROM (Read Only Memory) 105 storing a predetermined control program, a RAM (Random Access Memory, storage) 106 for temporarily storing data, a drive clock generation circuit 107 and peripheral circuits of these.

The crystal oscillator 18 generates and outputs a master clock signal with a high time accuracy which oscillates at a predetermined master frequency of, for example, about several hundreds of MHz.

The counter circuit 101 counts rising edges of a later-described slave clock signal output from the sheet feed control unit 20 via the signal line L2. In this way, the counter circuit 101 measures a clock number of the slave clock signal.

The timer circuit 102 measures a time equivalent to a predetermined multiple of a cycle of the master clock signal using the master clock signal output from the crystal oscillator 18.

The communication interface circuit 103 communicates various signals such as signals indicating control commands between the master control unit 10 and the sheet feed control unit 20 via the control line L1.

The CPU 104 operates in synchronization with the master clock signal output from the crystal oscillator 18. The CPU 104 configures processing units for performing various processings by executing the control program stored in the ROM 105 or the like. For example, the CPU 104 configures a drive controller 11, an image formation controller 12, a clock error calculator 13, an error recorder 14 and a correction parameter transmitter 15 as the processing units.

The drive controller 11 drives the motors 32, 42 and 52 at predetermined rotation speeds. Specifically, the drive controller 11 outputs a signal indicating an instruction to cause each driver 31, 41, 51 to output a drive clock signal of a frequency corresponding to the rotation speed of each motor 32, 42, 52 to the drive clock generation circuit 107.

Further, the drive controller 11 transmits a signal indicating an instruction to rotate the sheet feed roller 23 at a predetermined rotation speed to the sheet feed control unit 20 using the communication interface circuit 103.

The image formation controller 12 controls developing, transferring and fixing operations in the image forming unit 6.

The clock error calculator 13 obtains cycle information representing a cycle of a slave clock signal output from a signal output circuit 29 to be described later using the master clock signal output from the crystal oscillator 18. The clock error calculator 13 calculates an error of the slave clock signal based on this obtained cycle information. Note that the clock error calculator 13 is described in detail later.

The error recorder 14 stores the error of the slave clock signal calculated by the clock error calculator 13 in the RAM 106. Note that the error recorder 14 is described in detail later.

The correction parameter transmitter 15 corrects a control parameter to be used in the sheet feed control unit 20 using the error of the slave clock signal calculated by the clock error calculator 13. Then, the correction parameter transmitter 15 transmits the corrected control parameter to the sheet feed control unit 20 using the communication interface circuit 103. Note that the correction parameter transmitter 15 is described in detail later.

The drive clock generation circuit 107 includes unillustrated multiplier circuit and frequency divider circuit. The drive clock generation circuit 107 generates a drive clock signal of a frequency corresponding to the rotation speed of each motor 32, 42, 52 by multiplying or dividing the cycle of the master clock signal output from the crystal oscillator 18 according to an instruction output from the drive controller 11. The drive clock generation circuit 107 outputs the generated drive clock signal to each drivers 31, 41, 51.

The sheet feed control unit 20 includes an RC oscillation circuit (slave clock generator) 28, a signal output circuit (signal output unit) 29, a communication interface (I/F) circuit 203, a CPU 204 for performing a predetermined arithmetic processing, a ROM 205 storing a predetermined control program, a RAM 206 for temporarily storing data, a drive clock generation circuit 207 and peripheral circuits of these.

The RC oscillation circuit 28 generates and outputs a slave clock signal which has a lower time accuracy than the crystal oscillator 18 and oscillates at a slave frequency lower than the master frequency. The slave frequency is predetermined to be, for example, about several tens of MHz.

The signal output circuit 29 outputs the slave clock signal output from the RC oscillation circuit 28 to the master control unit 10 via the signal line L2.

The communication interface circuit 203 communicates various signals such as signals indicating control commands between the master control unit 10 and the sheet feed control unit 20 via the control line L1.

The CPU 204 operates in synchronization with the slave clock signal output from the RC oscillation circuit 28. The CPU 204 configures processing units for performing various processings by executing the control program stored in the ROM 205 or the like. For example, the CPU 204 configures a drive controller 25, a correction parameter receiver 26 and a parameter corrector 27 as the processing units.

The drive controller 25 drives the motor 22 at a predetermined rotation speed. Specifically, the drive controller 25 receives a signal transmitted from the drive controller 11 and indicating an instruction to rotate the sheet feed roller 23 at a predetermined rotation speed using the communication interface circuit 203. Then, the drive controller 25 outputs a signal indicating an instruction to cause a drive clock signal of a frequency corresponding to the rotation speed indicated by this received signal to be output to the driver 21 to the drive clock generation circuit 207.

The correction parameter receiver 26 receives the corrected control parameter transmitted by the correction parameter transmitter 15 using the communication interface circuit 203. Note that the correction parameter receiver 26 is described in detail later.

The parameter corrector 27 replaces the control parameter used in the sheet feed control unit 20 by the corrected control parameter received by the correction parameter receiver 26. Note that the parameter corrector 27 is described in detail later.

The drive clock generation circuit 207 includes unillustrated multiplier circuit and frequency divider circuit. The drive clock generation circuit 207 generates a drive clock signal of a frequency corresponding to the rotation speed of the motor 22 by multiplying or dividing the cycle of the slave clock signal output from the RC oscillation circuit 28 according to an instruction output from the drive controller 25. The drive clock generation circuit 207 outputs the generated drive clock signal to the driver 21.

Figure 4:
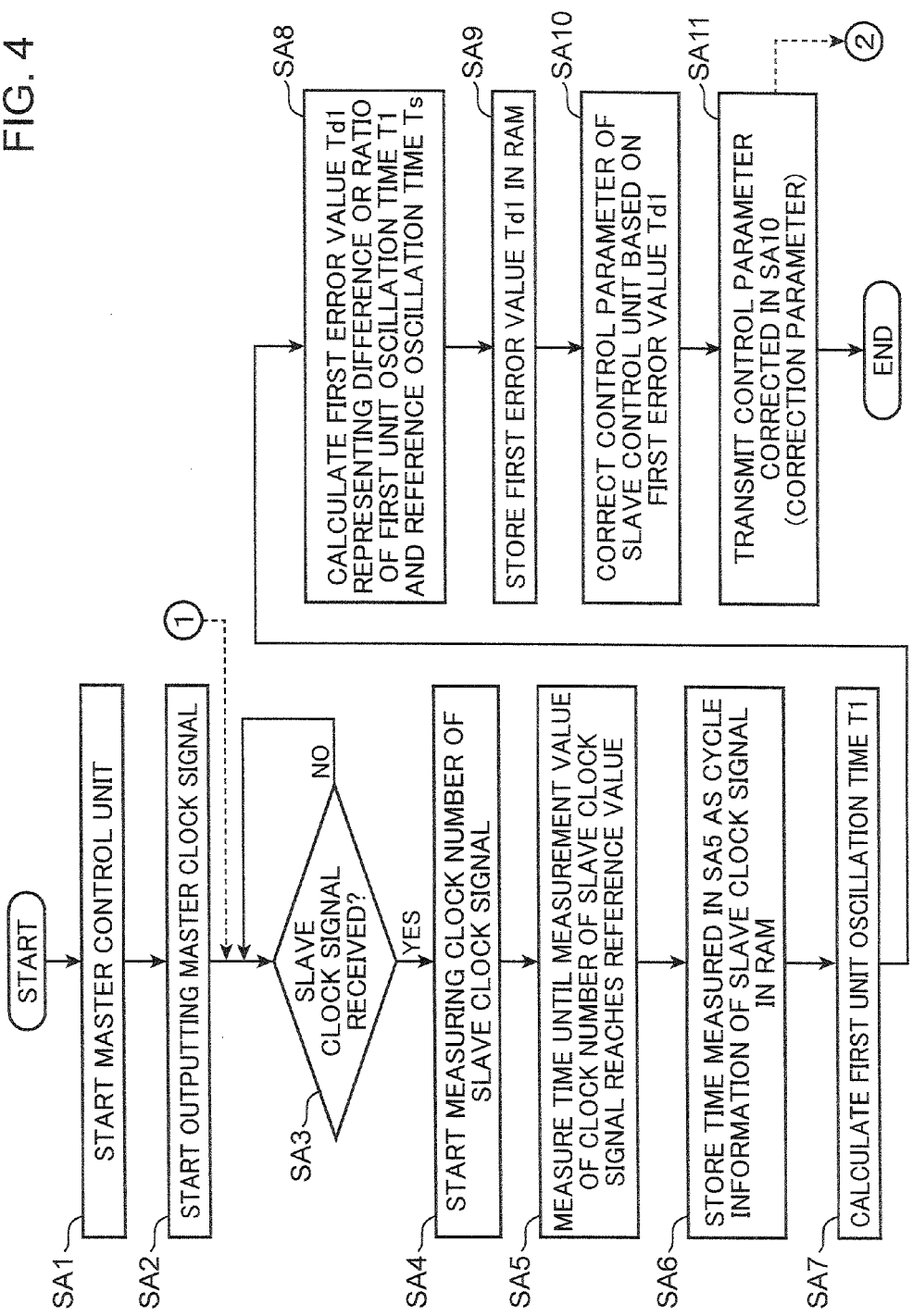
FIG. 4 is a flow chart showing operations of the master control unit relating to an operation of calculating an error of a slave clock signal.
Figure 5:
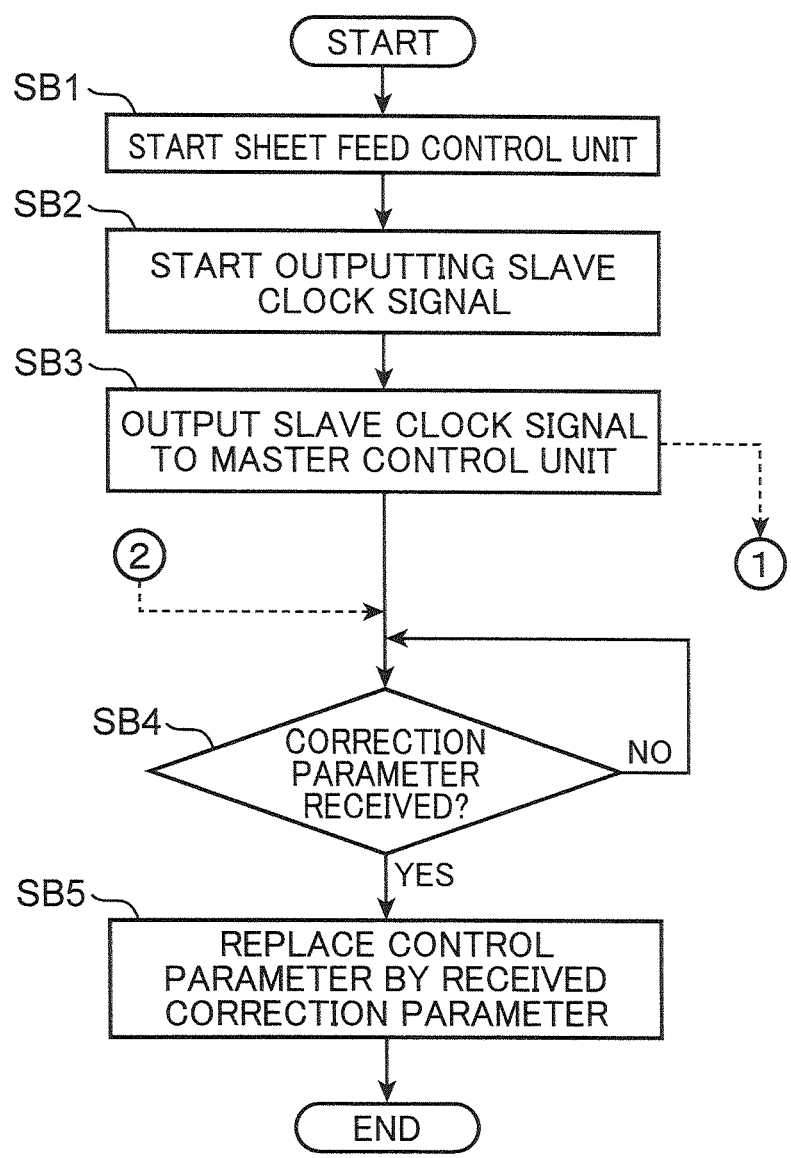
FIG. 5 is a flow chart showing operations of the sheet feed control unit relating to the operation of calculating the error of the slave clock signal.

FIG. 4 is a flow chart showing operations of the master control unit 10 relating to an operation of calculating an error of a slave clock signal. FIG. 5 is a flow chart showing operations of the sheet feed control unit 20 relating to the operation of calculating the error of the slave clock signal. The operation of calculating the error of the slave clock signal is described below using FIGS. 4 and 5. In this description, the clock error calculator 13, the error recorder 14, the correction parameter transmitter 15, the correction parameter receiver 26 and the parameter corrector 27 are described in detail.

As shown in FIGS. 4 and 5, when the complex machine 1 is turned on by a user, the master control unit 10 and the sheet feed control units 20 are respectively started (SA1, SB1).

In the master control unit 10, the crystal oscillator 18 starts outputting a master clock signal (SA2). At this time, the CPU 104 starts executing the control program stored in the ROM 105 to initialize the RAM 106 and the peripheral circuits.

In the sheet feed control unit 20, the RC oscillation circuit 28 starts outputting a slave clock signal (SB2). At this time, the CPU 204 starts executing the control program stored in the ROM 205 to initialize the RAM 206 and the peripheral circuits.

For example, in performing the initialization, the sheet feed control unit 20 reads the predetermined rotation speed of the sheet feed roller 23 stored in the ROM 205 in advance and stores it in the RAM 206. The drive controller 25 outputs a signal indicating an instruction to cause a drive clock signal of a frequency corresponding to the rotation speed stored in the RAM 206 to be output to the driver 21 in the case of rotating the sheet feed roller 23.

The signal output circuit 29 outputs the slave clock signal output from the RC oscillation circuit 28 to the master control unit 10 via the signal line L2 (SB3).

When receiving the slave clock signal output from the signal output circuit 29 (SA3; YES), the counter circuit 101 starts counting rising edges of the received slave clock signal. That is, the counter circuit 101 starts measuring the clock number of the slave clock signal (SA4).

Subsequently, the clock error calculator 13 measures a time, which is required for measurement until a measurement value reaches a predetermined reference value after the measurement of the clock number of the slave clock signal is started in Step SA4, using the timer circuit 102 (SA5). Note that the reference value is set at the clock number of the slave clock signal measured until an error of one cycle or longer of the master clock signal is produced after the measurement of the clock number of the slave clock signal is started, for example, based on an experimental value such as one obtained through a test operation. The reference time is stored in the ROM 105 or the like in advance.

Subsequently, the clock error calculator 13 stores the time measured in Step SA5 as cycle information representing the cycle of the slave clock signal in the RAM 106 (SA6).

Figure 6:
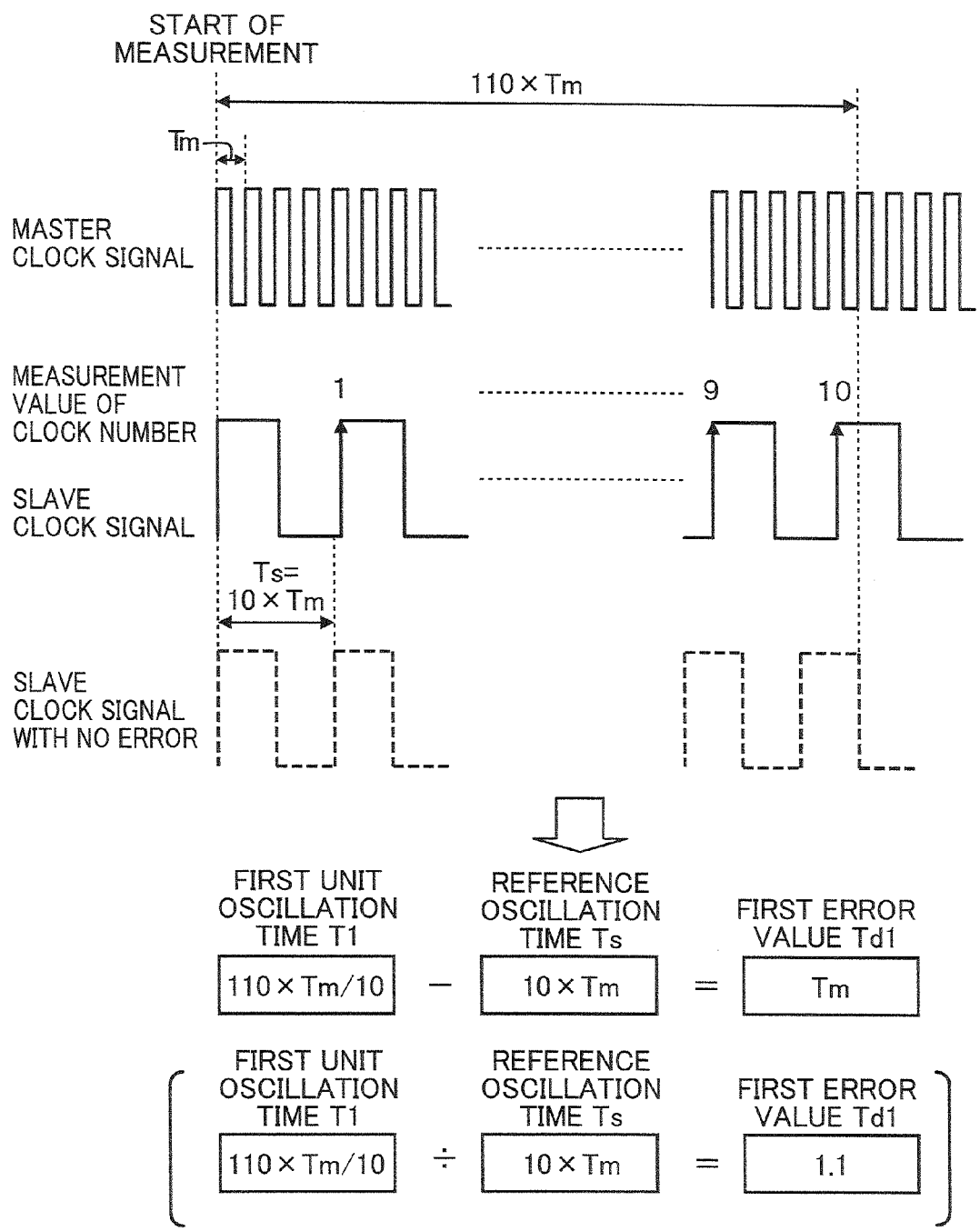
FIG. 6 is a chart showing an example of an error of the slave clock signal calculated by a clock error calculator.

FIG. 6 is a chart showing an example of the error of the slave clock signal calculated by the clock error calculator 13. In FIG. 6, Tm denotes one cycle of the master clock signal. Ts denotes a correct cycle of the slave clock signal. That is, Ts denotes one cycle of the slave clock signal when there is no error. The correct cycle of the slave clock signal is referred to as a reference oscillation time Ts below. Further, it is assumed that the reference oscillation time Ts is set at a time which is 10-fold (10×Tm) of one cycle Tm of the master clock signal.

It is further assumed that a time required for measurement until the measurement value reaches a reference value "10" after the measurement of the clock number of the slave clock signal is started by the counter circuit 101 is a time "110×Tm" equivalent to 110 cycles of the master clock signal.

In this case, the clock error calculator 13 measures the time required for measurement until the measurement value reaches the reference value "10" after the measurement of the clock number of the slave clock signal is started as the time "110×Tm" equivalent to 110 cycles of the master clock signal in Step SA5. Then, the clock error calculator 13 stores this measured time "110×Tm" as cycle information in the RAM 106 in Step SA6.

Subsequently, the clock error calculator 13 divides the time "110×Tm" stored as the cycle information in the RAM 106 in Step SA6 by the reference value "10". In this way, the clock error calculator 13 calculates a time required for one clock oscillation of the slave clock signal, i.e. a first unit oscillation time T1 which is a time equivalent to the cycle of the slave clock signal (SA7).

Specifically, the clock error calculator 13 sets a result "110×Tm/10" obtained by dividing the time "110×Tm" stored as the cycle information in the RAM 106 in Step SA6 by the reference value "10" as the first unit oscillation time T1 in Step SA7.

Subsequently, the clock error calculator 13 calculates a first error value Td1 representing a difference or a ratio of the first unit oscillation time T1 calculated in Step SA7 and the reference oscillation time Ts. Then, the clock error calculator 13 sets this calculated first error value Td1 as the error of the slave clock signal (SA8).

Specifically, in Step SA8, the clock error calculator 13 calculates the first error value Td1 (=Tm) representing the difference between the first unit oscillation time T1 and the reference oscillation time Ts by subtracting the reference oscillation time Ts (=10×Tm) from the first unit oscillation time T1 (=110×Tm/10) calculated in Step SA7. Then, the clock error calculator 13 sets this calculated first error value Td1 as the error of the slave clock signal.

Alternatively, in Step SA8, the clock error calculator 13 calculates the first error value Td1 (=1.1) representing a ratio of the first unit oscillation time T1 to the reference oscillation time Ts by dividing the first unit oscillation time T1 (=110×Tm/10) calculated in Step SA7 by the reference oscillation time Ts (=10×tm).

Subsequently, the error recorder 14 stores the first error value Td1 calculated in Step SA8 in the RAM 106 (SA9).

The correction parameter transmitter 15 corrects the control parameter to be used in the sheet feed control unit 20 using the first error value Td1 calculated in Step SA8 (SA10). Then, the correction parameter transmitter 15 transmits the correction parameter, which is the control parameter corrected in Step SA10, to the sheet feed control unit 20 (SA11).

On the other hand, in the sheet feed control unit 20, when the correction parameter transmitted from the correction parameter transmitter 15 is received by the correction parameter receiver 26 (SB4; YES), the parameter corrector 27 replaces the control parameter used in the sheet feed control unit 20 by this received correction parameter (SB6).

Specifically, the first error value Td1 calculated in Step SA8 is assumed to be the difference "Tm" between the first unit oscillation time T1 and the reference oscillation time Ts. In this case, the slave clock signal oscillates at a frequency (Ts+Tm) longer than the reference oscillation time Ts by one cycle of the master clock signal. That is, the slave clock signal oscillates at a slower pace than the correct slave clock signal with no error.

In this case, the correction parameter transmitter 15 calculates the cycle (Ts+Tm=11×Tm) of the slave clock signal by adding the first error value Td1 (Tm) calculated in Step SA8 to the reference oscillation time Ts in Step SA10. Then, the correction parameter transmitter 15 calculates a degree of correction (1.1) of the rotation speed of the sheet feed roller 23 by dividing the calculated cycle (11×Tm) of the slave clock signal by the reference oscillation time Ts (=10×Tm). Then, the correction parameter transmitter 15 transmits information indicating the correction of the rotation speed of the sheet feed roller 23 by the calculated degree (1.1) as the correction parameter to the sheet feed control unit 20.

Alternatively, the first error value Td1 calculated by the clock error calculator 13 in Step SA8 is assumed to be the ratio "1.1" of the first unit oscillation time T1 and the reference oscillation time Ts. In this case, the slave clock signal oscillates in a cycle (1.1×Ts) which is 1.1-fold of the reference oscillation time Ts. That is, the slave clock signal oscillates at a slower pace than the correct slave clock signal with no error.

In this case, in Step SA10, the correction parameter transmitter 15 sets the first error value Td1 (1.1) calculated in Step SA8 as a degree of correction of the rotation speed of the sheet feed roller 23. Then, the correction parameter transmitter 15 transmits information indicating the correction of the rotation speed of the sheet feed roller 23 by the calculated degree (1.1) as the correction parameter to the sheet feed control unit 20.

In the sheet feed control unit 20, the correction parameter is received by the correction parameter receiver 26 in Step SB5. That is, the information indicating the correction of the rotation speed of the sheet feed roller 23 by the predetermined degree (1.1-fold) is received by the correction parameter receiver 26. Then, in Step SB6, the parameter corrector 27 reads the rotation speed of the sheet feed roller 23 stored in the RAM 206 in Step SB2. Then, the parameter corrector 27 multiplies this read rotation speed and the degree (1.1) of correcting the rotation speed indicated by the received correction parameter. Then, the parameter corrector 27 replaces the rotation speed stored in the RAM 206 by this multiplication result.

Note that the information indicating the predetermined rotation speed of the sheet feed roller 23 may also be stored in the ROM 105 in advance. In accordance with this, the correction parameter transmitter 15 may multiply the rotation speed of the sheet feed roller 23 stored in the ROM 105 and the degree of correcting the rotation speed in Step SA10. Then, the correction parameter transmitter 15 may transmit the information indicting the corrected rotation speed indicated by this multiplication result as the correction parameter to the sheet feed control unit 20. In accordance with this, the parameter corrector 27 may replace the rotation speed stored in the RAM 206 by the corrected rotation speed indicated by the correction parameter received by the correction parameter receiver 26 in Step SB5.

According to the above embodiment, the cycle of the slave clock signal is longer than that of the master clock signal. Thus, the cycle of the slave clock signal needs not be converted into a predetermined multiple to obtain the cycle information representing the cycle of the slave clock signal using the master clock signal. Accordingly, the signal output circuit 29 transmits the slave clock signal to the master control unit 10 as it is without converting it. In this way, it can be avoided that the cycle of the slave clock signal cannot be precisely set to be the predetermined multiple due to conversion accuracy in the process of converting the cycle of the slave clock signal into the predetermined multiple. As a result, the cycle information precisely representing the cycle of the slave clock signal output from the signal output circuit 29 can be obtained. Then, the error of the slave clock signal can be accurately calculated based on the precise cycle information.

Further, according to the above embodiment, the clock error calculator 13 measures the time for measurement until the measurement value reaches the predetermined reference value after the measurement of the clock number of the slave clock signal is started using the master clock signal and obtains this measured time as the cycle information. Then, the clock error calculator 13 calculates the first unit oscillation time T1 that is a result obtained by dividing this measured time by the reference value. That is, the clock error calculator 13 calculates the cycle of the slave clock signal, which is a time required for one clock oscillation of the slave clock signal, as the first unit oscillation time T1. Then, the clock error calculator 13 calculates the first error value Td1 representing the difference or ratio of the first unit oscillation time T1 and the reference oscillation time Ts as the error of the slave clock signal.

As just described, the clock error calculator 13 can appropriately calculate the error of the slave clock signal as the difference or ratio of the first unit oscillation time T1 indicating the cycle of the slave clock signal output from the sheet feed control unit 20 and the reference oscillation time Ts corresponding to the correct cycle of the slave clock signal.

Further, according to the above embodiment, the error recorder 14 stores the error of the slave clock signal calculated by the clock error calculator 13 in the RAM 106. Thus, it is possible to calculate an error of a slave clock signal by the clock error calculator 13 and store the calculated error in the RAM 106 by the error recorder 14, for example, when the complex machine 1 is started.

Thus, after the error of the slave clock signal is stored in the RAM 106, the error of the slave clock signal can be easily obtained from the RAM 106 without causing the clock error calculator 13 to calculate an error of a slave clock signal. In this way, a time required to calculate an error of a slave clock signal can be reduced.

Further, according to the above embodiment, the master control unit 10 can accurately correct the control parameter to be used in the sheet feed control unit 20 based on the error accurately calculated by the clock error calculator 13. Then, the control parameter accurately corrected in this way is transmitted to the sheet feed control unit 20 and used as the control parameter used in the sheet feed control unit 20. Thus, even if there is an error in the slave clock signal, the operation of the sheet feed control unit 20 can be accurately corrected.

Further, according to the above embodiment, it is possible to obtain the cycle information accurately representing the cycle of the slave clock signal output from the RC oscillation circuit 28 by using the master clock signal with a high time accuracy output by the crystal oscillator 18. Thus, the sheet feed control unit 20 needs not include an expensive crystal oscillator. As a result, the sheet feed control unit 20 can be inexpensively configured to include the inexpensive RC oscillation circuit.

Note that the configurations and the like shown in FIGS. 1 to 6 are only an illustration of the embodiment according to the present disclosure and not intended to limit the present disclosure to this embodiment.

Figure 7:
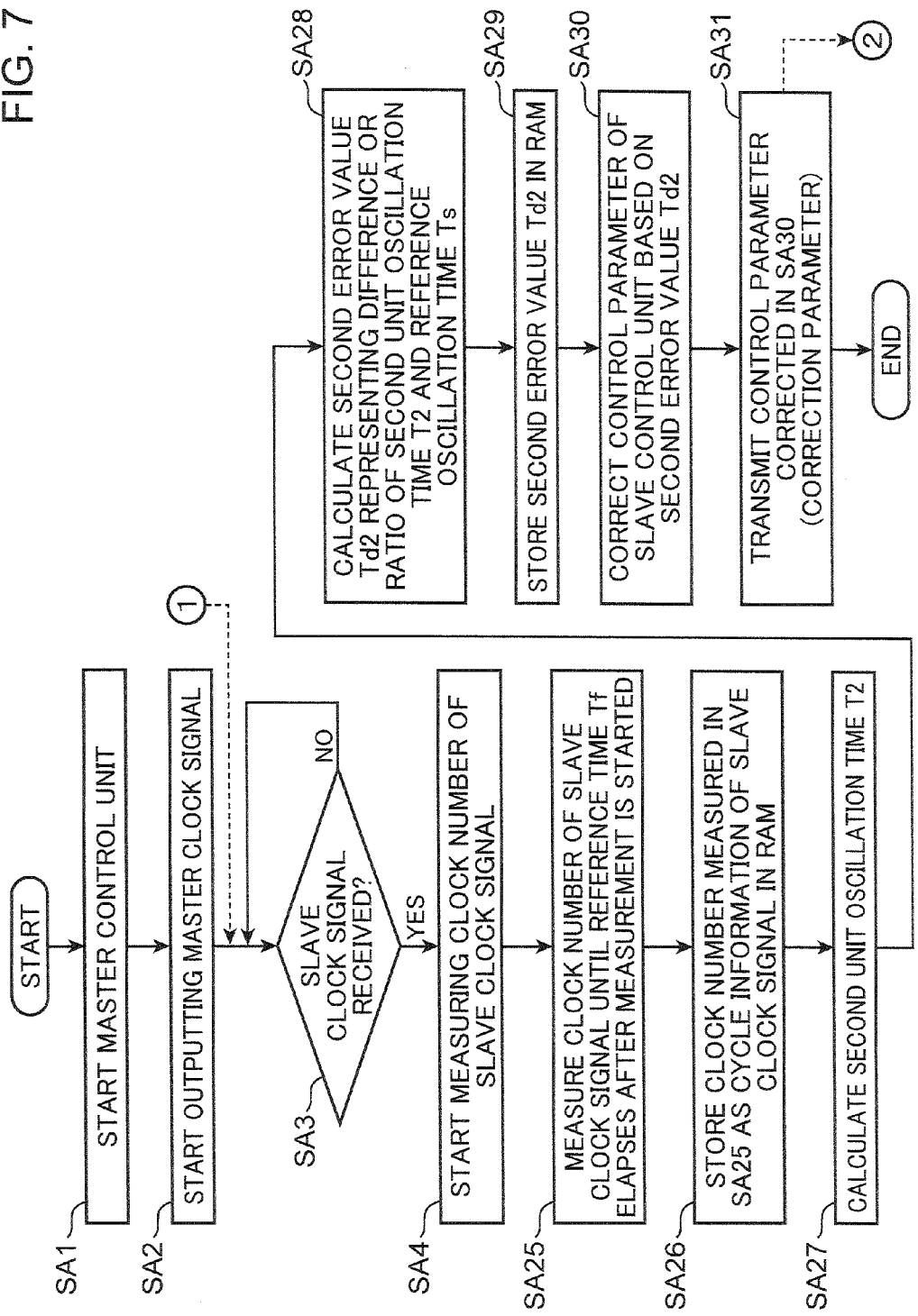
FIG. 7 is a flow chart showing operations of the master control unit according to another embodiment relating to the operation of calculating the error of the slave clock signal.

FIG. 7 is a flow chart showing operations of the master control unit 10 according to another embodiment relating to the operation of calculating the error of the slave clock signal. For example, as shown in FIG. 7, Steps SA5 to SA11 shown in FIG. 4 may be replaced by Steps SA25 to SA31.

Specifically, the clock error calculator 13 causes the counter circuit 101 to measure the clock number of the slave clock signal until the elapse of a predetermined reference time Tf is measured after the measurement of the clock number of the slave clock signal is started by the timer circuit 102 in Step SA4 (SA25). Note that the reference time Tf is set at a time elapsed until an error of one cycle or longer of the master clock signal is produced in the cycle of the slave clock signal after the measurement of the clock number of the slave clock signal is started, for example, based on an experimental value such as one obtained through a test operation. The reference time Tf is stored in the ROM 105 or the like in advance.

Subsequently, the clock error calculator 13 stores the clock number of the slave clock signal measured in Step SA25 as cycle information representing the cycle of the slave clock signal in the RAM 106 (SA26).

Figure 8:
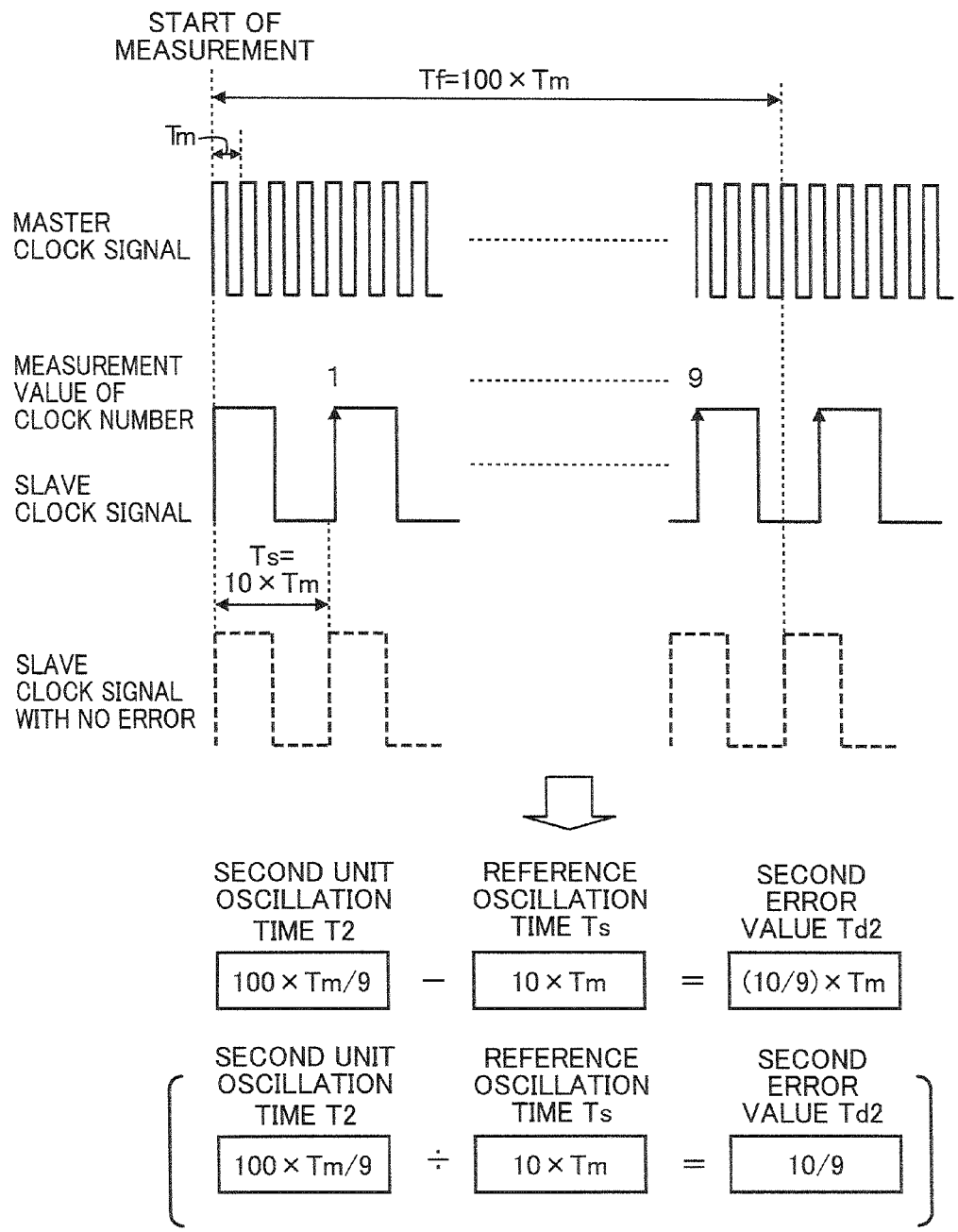
FIG. 8 is a chart showing an example, different from that of FIG. 6, of the error of the slave clock signal calculated by the clock error calculator.

FIG. 8 is a chart showing an example, different from that of FIG. 6, of the error of the slave clock signal calculated by the clock error calculator 13. In FIG. 8, Tm denotes one cycle of the master clock signal as in FIG. 6. Ts denotes the reference oscillation time as in FIG. 6. It is assumed that the reference oscillation time Ts is set at a time which is 10-fold of one cycle Tm of the master clock signal as in FIG. 6.

Further, the clock number of the slave clock signal measured by the counter circuit 101 until the elapse of a time "100×Tm" equivalent to 100 cycles of the master clock signal as the reference time Tf is measured after the measurement of the clock number of the slave clock signal is started by the counter circuit 101 is assumed to be "9".

In this case, the clock error calculator 13 measures the clock number of the slave clock signal until the elapse of the reference time Tf "110×Tm" is measured by the timer circuit 102 after the measurement of the clock number of the slave clock signal is started to be "9" in Step SA25. Then, the clock error calculator 13 stores this measured clock number "9" as cycle information in the RAM 106 in Step SA26.

Subsequently, the clock error calculator 13 divides the reference time Tf "110×Tm" by the clock number "9" stored as the cycle information in the RAM 106 in Step SA26. In this way, the clock error calculator 13 calculates a time required for one clock oscillation of the slave clock signal, i.e. a second unit oscillation time T2 which is a time equivalent to the cycle of the slave clock signal (SA27).

Specifically, in Step SA27, the clock error calculator 13 divides the reference time Tf "100×Tm" by the clock number "9" stored as the cycle information in the RAM 106 in Step SA26. Then, the clock error calculator 13 calculates this division result "100×Tm/9" as the second unit oscillation time T2.

Subsequently, the clock error calculator 13 calculates a second error value Td2 representing a difference or a ratio of the second unit oscillation time T2 calculated in Step SA27 and the reference oscillation time Ts. Then, the clock error calculator 13 sets this calculated second error value Td2 as the error of the slave clock signal (SA28).

Specifically, in Step SA28, the clock error calculator 13 calculates the second error value Td2 (=(10/9)×Tm) representing the difference between the second unit oscillation time T2 and the reference oscillation time Ts by subtracting the reference oscillation time Ts (=10×Tm) from the second unit oscillation time T2 (=100×Tm/9) calculated in Step SA27. Then, the clock error calculator 13 sets this calculated second error value Td2 as the error of the slave clock signal.

Alternatively, in Step SA28, the clock error calculator 13 calculates the second error value Td2 (=10/9) representing a ratio of the second unit oscillation time T2 to the reference oscillation time Ts by dividing the second unit oscillation time T2 (=110×Tm/9) calculated in Step SA27 by the reference oscillation time Ts (=10×Tm).

Subsequently, the error recorder 14 stores the second error value Td2 calculated by the clock error calculator 13 in Step SA8 in the RAM 106 (SA9).

The correction parameter transmitter 15 corrects the control parameter to be used in the sheet feed control unit 20 using the second error value Td2 calculated in Step SA28 as in Step SA10 (SA30). Then, the correction parameter transmitter 15 transmits the correction parameter, which is the control parameter corrected in Step SA30, to the sheet feed control unit 20 (SA31) as in Step SA11.

According to this configuration, the clock error calculator 13 calculates the second unit oscillation time T2 that is a result obtained by dividing the predetermined reference time Tf by the clock number of the slave clock signal measured within the reference time Tf using the master clock signal. That is, the clock error calculator 13 calculates the cycle of the slave clock signal, which is a time required for one clock oscillation of the slave clock signal, as the second unit oscillation time T2. Then, the clock error calculator 13 calculates the second error value Td2 representing the difference or ratio of the second unit oscillation time T2 and the reference oscillation time Ts as the error of the slave clock signal.

As just described, the clock error calculator 13 can appropriately calculate the error of the slave clock signal as the difference or ratio of the second unit oscillation time T2 indicating the cycle of the slave clock signal output from the sheet feed control unit 20 and the reference oscillation time Ts corresponding to the correct cycle of the slave clock signal.

Further, for example, Steps SA24 to SA28 shown in FIG. 7 may be executed, for example, after Steps SA4 to SA8 shown in FIG. 4 are executed. In accordance with this, an average value ("(19/18)×Tm" or "199/180") of the first error value Td1 (e.g. "Tm" or "1.1" (FIG. 6) calculated by the execution of Steps SA4 to SA8 and the second error value Td2 (e.g. "(10/9)×Tm" or "10/9" (FIG. 8)) calculated by the execution of Steps SA24 to SA28 may be set as the error of the slave clock signal calculated in Step SA8 or SA28.

In this case, the clock error calculator 13 calculates the average value of the first and second error values Td1, Td2 as the error of the slave clock signal. That is, by increasing the number of error calculations by one, the clock error calculator 13 can enhance accuracy in calculating the error of the slave clock signal as compared with the case where either one of the first and second error values Td1, Td2 is set as the error of the slave clock signal.

Note that the configurations and the like shown in FIGS. 7 and 8 are also only an illustration of the embodiment according to the present disclosure and not intended to limit the present disclosure to this embodiment.

Further, the sheet feed control unit 20 may include an oscillation circuit using, for example, a ceramic oscillator, instead of the RC oscillation circuit 28. Further, the master control unit 10 may include an oscillation circuit using, for example, a ceramic oscillator for outputting a clock signal with a higher time accuracy than the slave clock signal instead of the crystal oscillator 18.

Further, the CPU 104 may not configure the correction parameter transmitter 15. Further, the CPU 204 may not configure the correction parameter receiver 26. In accordance with this, Steps SA10 to SA11 (FIG. 4), Steps SA30 to SA31 (FIG. 7) and Steps SB4 to SB5 (FIG. 5) may be omitted.

Further, the CPU 104 may not configure the error recorder 14. In accordance with this, Step SA9 (FIG. 4) and Step SA29 (FIG. 7) may be omitted.

In the above embodiment, the image forming apparatus according to the present disclosure is applied to the complex machine 1. The present disclosure can also be applied to image forming apparatuses such as copiers, scanner devices and facsimile machines.

According to the present disclosure as described above, it is possible to accurately calculate an error of a clock signal in an image forming apparatus including a plurality of control units which operates in synchronization with clock signals and configured to carry out a decentralized control.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus, comprising:
   a master control unit configured to operate in synchronization with a master clock signal which oscillates at a predetermined master frequency;
   a slave control unit configured to operate according to an operation instruction by the master control unit in synchronization with a slave clock signal which oscillates at a slave frequency lower than the master frequency;
   wherein
   the slave control unit includes:
      a slave clock generator for generating the slave clock signal; and
      a signal output unit for outputting the slave clock signal to the master control unit; and
   the master control unit includes:
      a master clock generator for generating the master clock signal with a higher time accuracy than the slave clock signal; and a clock error calculator that uses the master clock signal to measure an output from the signal output unit for obtaining cycle information representing a cycle of the slave clock signal that is a target clock signal for calculation of an error and calculates an error of the slave clock signal based on the obtained cycle information; and a timer circuit for measuring a time equivalent to a predetermined multiple of a cycle of the master clock signal;

the clock error calculator uses the master clock signal to measure a clock number of the slave clock signal, measures a time required for measurement until a measurement value reaches a predetermined reference value after the measurement is started, using the timer, obtains the measured time as the cycle information, and calculates a first error value representing a difference or a ratio of a first unit oscillation time which is a result obtained by dividing the obtained time by the reference value and a reference oscillation time predetermined as a correct cycle of the slave clock signal as the error of the slave clock signal, the clock error calculator further uses the master clock signal to measure a clock number of the slave clock signal within a predetermined reference time, obtains the measured clock number as the cycle information, calculates a second error value representing a difference or a ratio of a second unit oscillation time which is a result obtained by dividing the reference time by the obtained clock number and the reference oscillation time, and calculates an average value of the first and second error values as the error of the slave clock signal.

2. An image forming apparatus according to claim 1, further comprising:

a storage configured to store information; and an error recorder configured to record the error of the slave clock signal calculated by the clock error calculator in the storage.

3. An image forming apparatus according to claim 1, wherein:

the master control unit further includes a correction parameter transmitter for correcting, based on the error calculated by the clock error calculator, a control parameter to be used in the slave control unit and transmitting the corrected control parameter to the slave control unit; and the slave control unit further includes:

a correction parameter receiver for receiving the corrected control parameter transmitted from the correction parameter transmitter; and a parameter corrector for replacing the control parameter used in the slave control unit by the corrected control parameter received by the correction parameter receiver.

4. An image forming apparatus according to claim 1, wherein:

the master clock generator is a crystal oscillator; and the slave clock generator is an RC oscillation circuit.

5. An image forming apparatus according to claim 1, further comprising:

an overall control unit configured to control the operation of the entire image forming apparatus;

an image forming unit configured to form an image on a recording sheet; and a sheet feeding unit for feeding the recording sheet to the image forming unit, the sheet feeding unit including a sheet feed control unit for controlling a recording sheet feeding operation, wherein:

the master control unit is the overall control unit; and the slave control unit is the sheet feed control unit.

* * * * *